United States Patent

Morita

[11] Patent Number: 5,469,158
[45] Date of Patent: Nov. 21, 1995

[54] APPARATUS FOR CORRECTING THE DETECTED HEADING OF A VEHICLE

[75] Inventor: Kazuya Morita, Osaka, Japan

[73] Assignee: Sumitomo Electric Industries, Ltd., Osaka, Japan

[21] Appl. No.: 263,417

[22] Filed: Jun. 21, 1994

Related U.S. Application Data

[63] Continuation of Ser. No. 45,598, Apr. 9, 1993, abandoned.

[30] Foreign Application Priority Data

Apr. 20, 1992 [JP] Japan ................... 4-099777
Apr. 20, 1992 [JP] Japan ................... 4-099778

[51] Int. Cl.⁶ .................. G08G 1/0969; G06F 19/00
[52] U.S. Cl. ............................. 340/988; 364/460
[58] Field of Search ................... 340/988, 990, 340/995; 364/460

[56] References Cited

U.S. PATENT DOCUMENTS

| | | | |
|---|---|---|---|
| 4,680,715 | 7/1987 | Pawelek | 340/988 X |
| 5,115,238 | 5/1992 | Shimizu | 340/988 |
| 5,117,363 | 5/1992 | Akiyama | 340/990 X |
| 5,119,301 | 6/1992 | Shimizu | 340/995 |
| 5,124,924 | 6/1992 | Fukushima | 340/995 X |
| 5,179,519 | 1/1993 | Adachi | 340/990 X |
| 5,343,512 | 8/1994 | Wang | 340/988 |

FOREIGN PATENT DOCUMENTS

| | | |
|---|---|---|
| 0393935 | 10/1990 | European Pat. Off. |
| 0451607 | 10/1991 | European Pat. Off. |
| 0496538 | 7/1992 | European Pat. Off. |
| 58-39360 | 8/1983 | Japan . |
| 63-148115 | 6/1988 | Japan . |
| 64-53112 | 3/1989 | Japan . |
| 3188316 | 8/1991 | Japan . |

OTHER PUBLICATIONS

Patent Abstracts of Japan, vol. 015, No. 449, 14 Nov. 1991.

*Primary Examiner*—Hezron E. Williams
*Assistant Examiner*—Christine K. Oda
*Attorney, Agent, or Firm*—Lane, Aitken & McCann

[57] ABSTRACT

A vehicle heading correcting apparatus comprising a gyro, an integrating unit for integrating output data of the gyro, a global positioning system receiver, an acquisition unit for acquiring heading data of a vehicle supplied from the global positioning system receiver, a first computing unit for computing a first turning angle of the vehicle based on two consecutive data of the heading data acquired by the acquisition unit, a second computing unit for computing a second turning angle of the vehicle based on an integrated value of the output data of the gyro obtained by the integrating unit during a period of time that the two consecutive data are acquired, an offset computing unit for computing a difference between the first and second turning angles and for computing an offset value of the output data of the gyro by diving the difference by the period of time, and an offset correcting unit for correcting the output data of the gyro with the offset value calculated by the offset computing unit.

6 Claims, 8 Drawing Sheets

APPARATUS FOR CORRECTING THE DETECTED HEADING OF A VEHICLE

This application is a continuation of application Ser. No. 08/045,598, filed Apr. 9, 1993, now abandoned.

FIELD OF THE INVENTION

The present invention relates to an apparatus which detects the current heading of a vehicle with a gyro or both of a gyro and a GPS (Global Positioning System) receiver.

DESCRIPTION OF THE PRIOR ART

As an apparatus for providing information about the current heading of a vehicle traveling streets, there has been proposed a vehicle heading detecting apparatus, which is provided with a gyro for detecting the heading of a vehicle and a processing unit for processing the output signal of the gyro and obtains the current heading data of the vehicle with a heading change amount (angular velocity) $\delta\theta$ that occurs upon movement of the vehicle. Based on the angular velocity $\delta\theta$, the current heading $\theta$ of the vehicle is calculated by the following equation:

$$\theta = \theta_o + \delta\theta$$

where $\delta_o$ is a heading obtained in the last sampling.

Based on the current heading $\theta$ and a travel distance $\delta L$ obtained, for example, from the output of a wheel sensor, the current location data (Px, Py) of the vehicle can be obtained by adding the east-west directional component $\delta x$ (= $\delta L \times \cos \theta$) and south-north directional component $\delta y$ (= $\delta L \times \sin \theta$) of the travel distance $\delta L$ to the previous location data (Px', Py'). Therefore, the aforementioned heading detecting apparatus has been used for detecting the location of a vehicle. However, the gyro tends to generate an output (offset) due to the influence of temperatures or humidities, even when the gyro output should be zero during the time that the vehicle is in its stopped state or its straight traveling state. Since this offset output is accumulated with time, the heading of the vehicle that departs from an actual heading of the vehicle is to be detected. It is therefore necessary to obtain an accurate heading at all times and to correct a detected angular velocity with the accurate heading. Then, making use of the fact that only the offset occurs in the gyro output when the vehicle stands still, there has been proposed a method of subtracting the offset from a subsequent output during travel. Many apparatuses using such a method have been proposed (e.g., Japanese Patent Publication SHO 58-39360).

However, the offset of the gyro tends to drift due to changes in temperatures and humidities independently of whether the vehicle is in its stopped state or traveling state. Therefore, even if the gyro output during travel is corrected with an offset value obtained during the stop of the vehicle, a value after the offset correction will contain errors because of the aforementioned drift.

FIG. 8 shows how the output of the gyro drifts with time, t. It will be seen from the figure that an actual offset value $\Omega$ departs from an estimated offset value $\Omega'$ measured at the time, to, during the stop of the vehicle. If the period of time from the start of the vehicle to the next stop of the vehicle is short, the drift of the gyro is small and can be corrected, but if the period of time from the start of the vehicle to the next stop of the vehicle is long, the drift of the gyro cannot be corrected and becomes larger and larger. In such a case, errors caused by the drift of the gyro are accumulated.

As a method for providing information about the actual location of a vehicle traveling streets, there is known "dead reckoning", in which a distance sensor, a heading sensor (GPS receiver or gyro) and a processing unit for processing the distance and heading data acquired from the distance and heading sensors are employed and the current location data of the vehicle are acquired with an amount of distance change $\delta L$ and an amount of heading change $\delta\theta$ (in a case where a gyro is used) or a heading $\theta$ (in a case where a GPS receiver is used). In dead reckoning, the east-west directional component $\delta x$ (= $\delta L \times \cos \theta$) and south-north directional component $\delta y$ (= $\delta L \times \sin \theta$) of the distance change amount $\delta L$ that occurs as the vehicle moves along a street are calculated, and the current location output data (Px, Py) of the vehicle are acquired by adding the calculated components $\delta x$ and $\delta y$ to the previous location output data (Px', Py'). However, there is the drawback that the accumulation of errors occurs due to inherent limitations on the achievable accuracy of the heading sensor.

That is, in a case where the heading of the vehicle is obtained by measuring Doppler shift which occurs by receiving waves from GPS satellites during travel, an error in the GPS heading is increased as the speed of the vehicle is decreased. When, on the other hand, the gyro is employed, it is known that an error in the gyro output data will appear frequently at the time that the heading change has become more than a predetermined value, at the time that the power source is turned on, at the time that the vehicle travels at very low speeds or at the time that it is detected that the vehicle is traveling on rough roads such as mountain roads. Unless compensation for the errors is made, the dead reckoned positions will become increasingly imprecise or inaccurate.

Then, it has been proposed that both the gyro and the GPS receiver are used. If either the angular velocity data of the gyro or the heading data of the GPS receiver will be reduced in reliability, one data can be compensated for by the other data. That is to say, the current heading of the vehicle can be estimated by calculating Kalman filter gain taking into consideration the characteristic errors inherently contained in the outputs of the gyro and the GPS receiver, and by processing the GPS receiver heading output and the gyro heading output with a weight processing method which is based on the calculated Kalman filter gain. However, in this method, it is important how the characteristic error components contained in the gyro output and the GPS receiver output are evaluated.

That is to say, the individual error components are evaluated by some method and if these components are set to constant values, the processing can be most easily performed. However, setting to the constant values is insufficient, and it is desirable to evaluate the error components accurately at real time by some method. In addition, since the offset that is contained in the angular velocity data of the gyro varies with time, it is necessary to take into consideration the error in the angular velocity data resulting from that variation. Furthermore, it is also necessary to take the scale factor (output gain) of the gyro into consideration because sometimes the scale factor departs from a standard value.

The inventor of the present application has proposed a heading detecting apparatus (Japanese Patent Laid-open Publication HEI 3-188316), which measures the outputs of the gyro and the GPS receiver and processes them at real time and is capable of accurately estimating the current heading of a vehicle with the aid of the output higher in reliability between the both outputs. In this apparatus, only dispersion values that are contained in the final outputs of the gyro and the GPS receiver are measured, and individual error factors contained in the outputs of the gyro and the GPS receiver have not been taken into consideration.

It is, accordingly, an important object of the present invention to provide an improved vehicle heading correcting apparatus which is capable of accurately correcting an offset value of a gyro even during travel.

It is another important object of the present invention to provide an improved heading detecting apparatus which is capable of estimating the current heading of a vehicle accurately by individually analyzing and evaluating the error factors contained in the heading data of the GPS receiver and in the angular velocity data of the gyro and by determining the rate of use of the output data of the gyro and the GPS receiver.

SUMMARY OF THE INVENTION

In accordance with one important aspect of the present invention, there is provided a vehicle heading correcting apparatus comprising a gyro, integrating means for integrating output data of the gyro, a global positioning system receiver, and acquisition means for acquiring heading data of a vehicle supplied from the global positioning system receiver. The vehicle heading correcting apparatus further comprises first computing means for computing a first turning angle of the vehicle based on two consecutive data of the heading data acquired by the acquisition means, second computing means for computing a second turning angle of the vehicle based on an integrated value of the output data of the gyro obtained by the integrating means during a period of time that the two consecutive data are acquired, offset computing means for computing a difference between the first and second turning angles and for computing an offset value of the output data of the gyro by diving the difference by the period of time, and offset correcting means for correcting the output data of the gyro with the offset value calculated by the offset computing means.

In the apparatus constructed as described above, two heading data are acquired from the global positioning system receiver, independently of whether the vehicle is moving or stopped, and a turning angle of the vehicle during a period of time that the two heading data is obtained. In addition, a turning angle of the vehicle is also obtained based on an integrated value of the outputs of the gyro. Based on a difference between the two turning angles, an offset value of the gyro output is obtained and therefore the gyro output can be corrected with the offset value even when the vehicle is moving. Thus, since the offset of the gyro output and also the drift of the offset can be corrected even when the vehicle is moving, a more accurate heading of the vehicle can be detected.

In accordance with another important aspect of the present invention, there is provided a heading detecting apparatus comprising a global positioning system receiver for outputting heading data of a vehicle, and a gyro for outputting angular velocity data of the vehicle. The heading detecting apparatus, as shown in FIG. 9, further comprises first means (A), second means (B), and third means (C) connected to the global positioning system receiver. The first means (A) is connected to the gyro for calculating an error of an offset value that is contained in the angular velocity data of the gyro. The second means (B) is connected to the first means (A) for calculating an error that is contained in the angular velocity data of the gyro, on the basis of the error of the offset value calculated by the first means (A), a change rate of time of the error of the offset value multiplied by a predetermined time, and the angular velocity data of the gyro multiplied by an error of a scale factor of the gyro, The third means (C) is connected to the global positioning system receiver for calculating an error that is contained in the heading data of the global positioning system receiver and depends on at least a velocity of the vehicle. The heading detecting apparatus further comprises fourth means (D) and fifth means (E). The fourth means (D) is connected to the second means (B) and the third means (C) for calculating a Kalman filter gain by calculating a degree of reliability of the angular velocity data from the error of the angular velocity data of the gyro calculated by the second means (B) and a degree of reliability of the heading data from the error calculated by the third means (B). The fifth means (E) is connected to the fourth means (D) for calculating a current estimated heading of the vehicle by weight processing, on the basis of the Kalman filter gain, heading data obtained from the angular velocity data of the gyro and also the heading data outputted from the global positioning system receiver.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
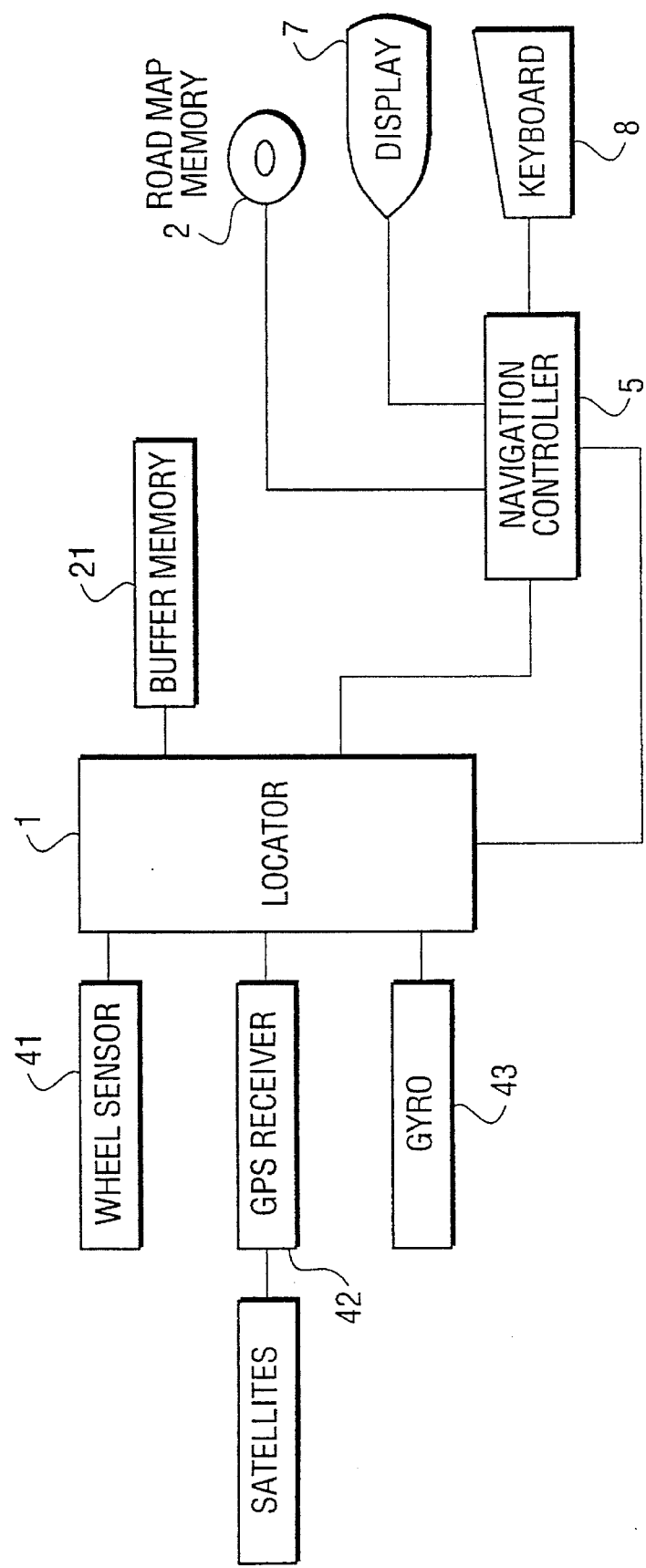
FIG. 1 is a block diagram showing a location detecting into which a vehicle heading correcting apparatus of the present invention is incorporated.

FIG. 1 shows a preferred embodiment of a vehicle heading correcting apparatus of the present invention which is applied to a vehicle location detecting apparatus.

The location detecting apparatus comprises a wheel sensor 41 which senses the number of rotations of the left and right wheels (not shown) respectively of a vehicle (this sensor is used as a distance sensor), a GPS receiver 42 for sensing the heading of the vehicle, and a gyro 43. The gyro 43 is selected from among an optical fiber gyro which reads a turning angular velocity as a phase change of interference light, a vibration gyro which senses a turning angular velocity with the aid of a cantilever vibration technique of a piezoelectric element, and a mechanical type gyro. The location detecting apparatus further comprises a road map memory 2 for storing road map data, a locator 1 which calculates an estimated heading of a vehicle in accordance with the output data sensed by the gyro 43 and GPS receiver 42 and also calculates the location of the vehicle with the aid of the data of the wheel sensor 41, a buffer memory 21 to which the location and heading of the vehicle are inputted, a navigation controller 5, a display 7 connected to the navigation controller 5 for displaying on the map the heading of the vehicle read out of the buffer memory 21, and a keyboard 8 connected to the navigation controller 5.

In the locator 1 described above, the number of rotations of the wheel is obtained by counting the number of the pulses outputted from the wheel sensor 41 with a counter (not shown), and travel distance output data per unit time are calculated by multiplying the count data of the counter by a predetermined constant number indicative of a distance per one count. Also, a relative change in the heading of the vehicle is obtained from the gyro 43. Based on the relative change and the absolute heading output data of the GPS receiver 42, the locator 1 calculates the heading output data of the vehicle. The locator 1 then detects the current location of the vehicle with the distances traveled by the vehicle and the heading of the vehicle. In addition, the locator 1, according to the present invention, calculates an angle of turning of the vehicle based on the output data sensed two times by the GPS receiver 42 and also an angle of turning of the vehicle based on an integrated value of the output data outputted from the gyro 43 during the period of time in which the two output data of the GPS receiver 42 were obtained. The locator 1 then calculates an offset value of the gyro output by dividing a difference between the two turning angles by the period of time in which they were obtained. The locator 1 has also a function of correcting the offset value of the gyro.

The aforementioned road map memory 2 stores road map data of a predetermined area in advance and comprises a semiconductor memory, cassette tape, CD-ROM, IC memory, DAT or the like.

The display 7 comprises a CRT display, crystalline liquid display or the like and displays a road map that the vehicle is traveling and a current heading of the vehicle.

The navigation controller 5 is constituted by a graphic processor, an image processing memory and the like, and generates instructions to perform a retrieval of the map on the display 7, switching of scale, scrolling, a display of the current heading and the like.

The vehicle heading detecting process by the apparatus constructed as described above will hereinafter be described in detail. During travel, the location and heading of the vehicle, together with the road map, are displayed on the display 7 in accordance with the individual sensor output data stored in the locator 1. Also, during the display, the output data of the GPS receiver 42 are read in every constant time.

Figure 2:
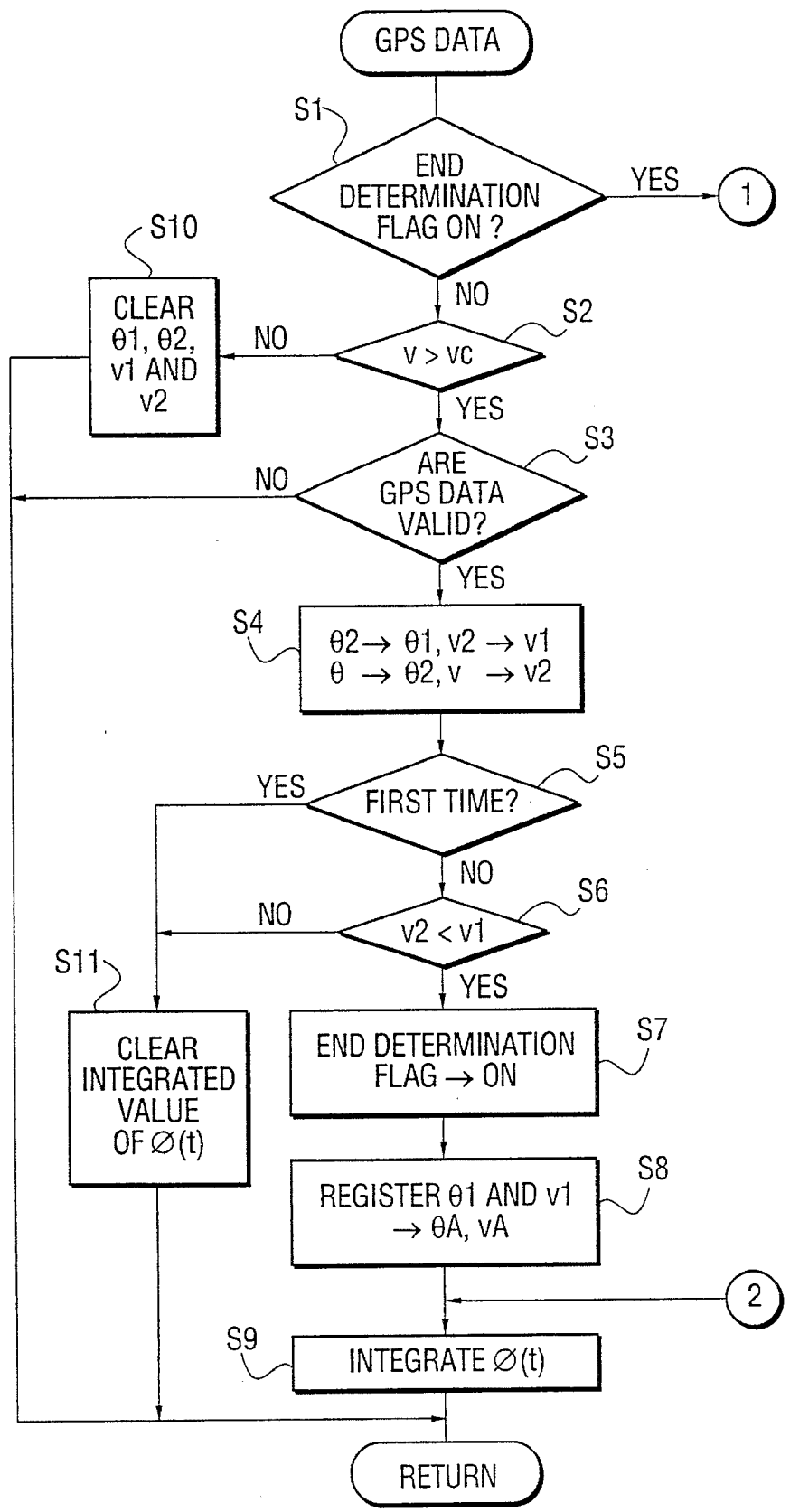
FIG. 2 is a flow chart showing how the heading of the vehicle is corrected based on the output data of the GPS receiver of FIG. 1.
Figure 3:
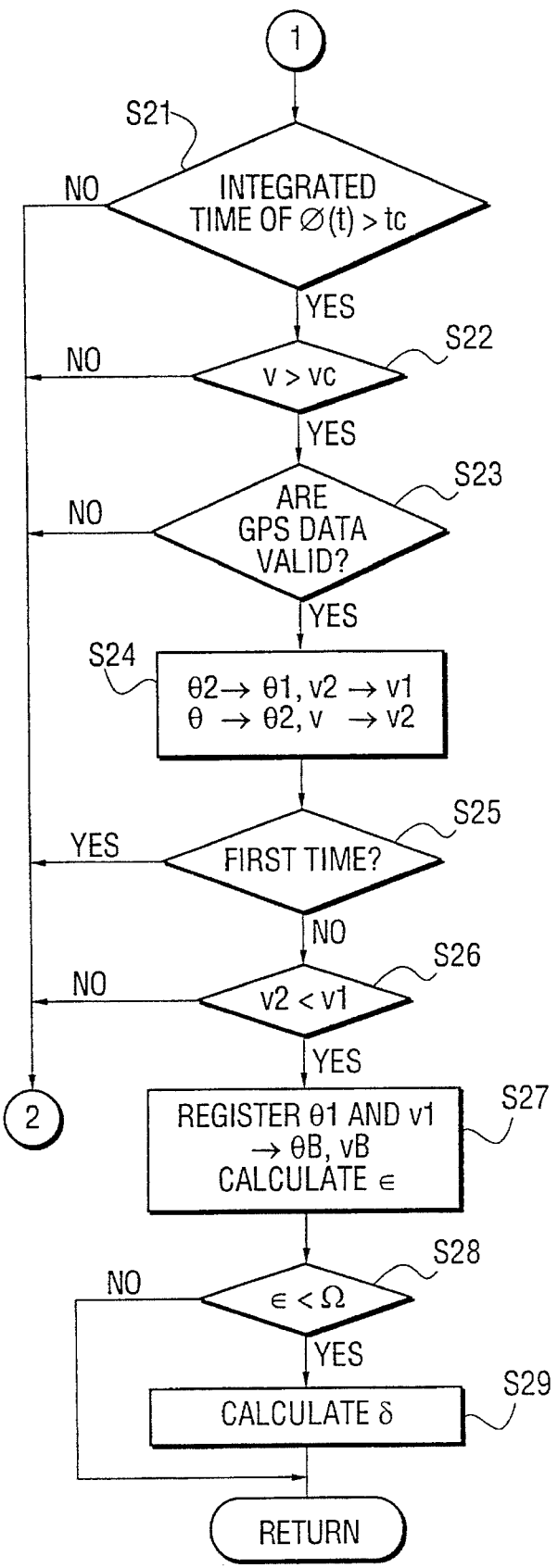
FIG. 3 is a flow chart showing how the heading of the vehicle is corrected based on the output data of the GPS receiver of FIG. 1.
Figure 4:
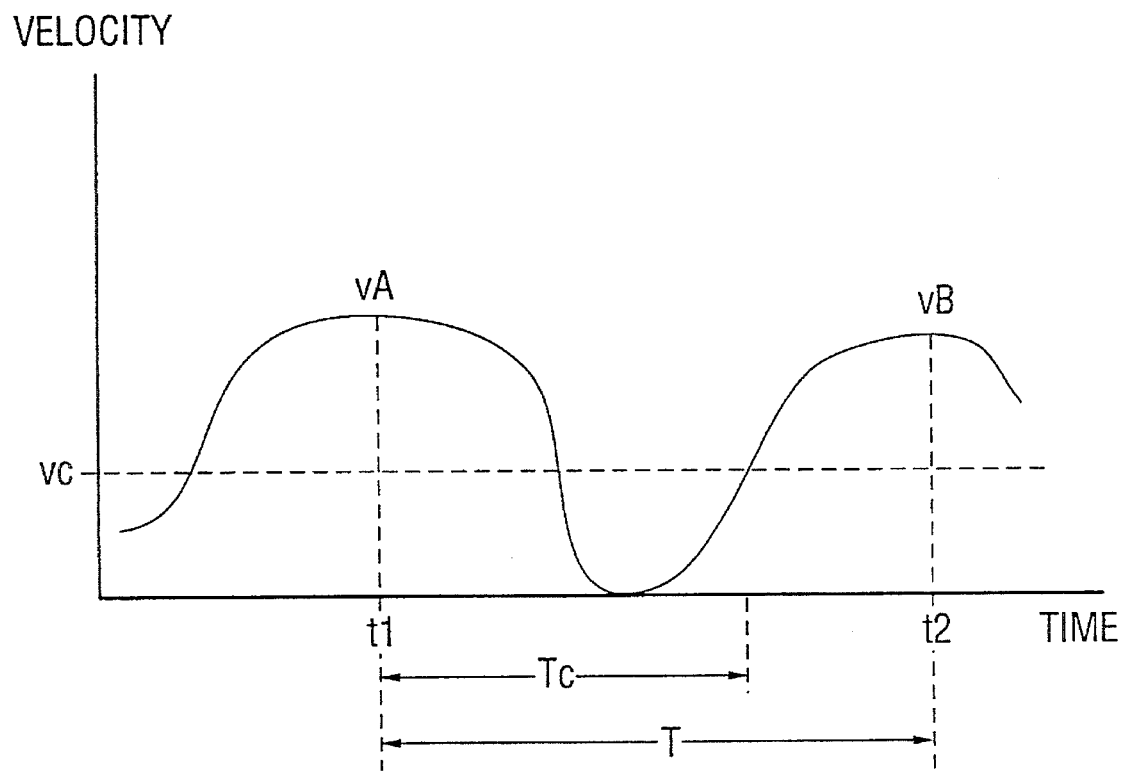
FIG. 4 is a graph showing how the velocity of the vehicle is varied with time.
Figure 8:
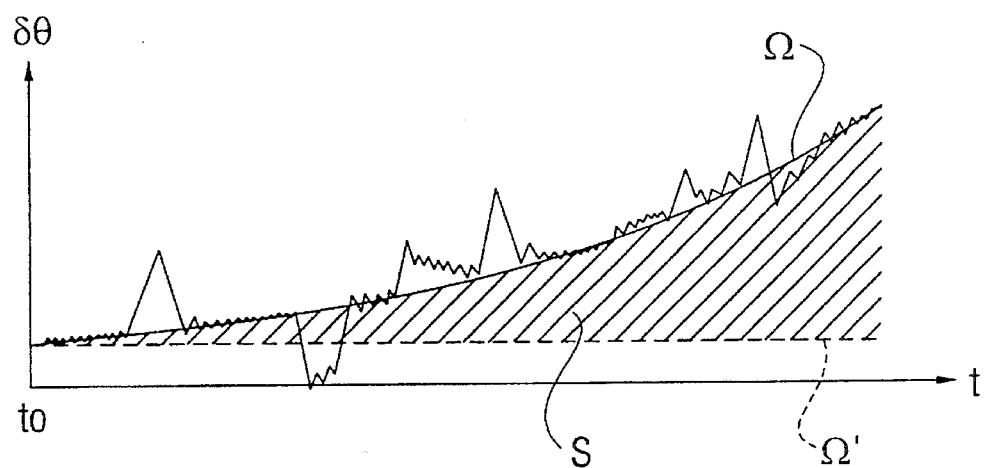
FIG. 8 is a graph showing how the output of the gyro drifts with time.

FIGS. 2 and 3 show how the heading of the vehicle is corrected based on the output data of the GPS receiver 42. FIG. 4 is a graph showing how the velocity of the vehicle is varied with time.

Figure 5:
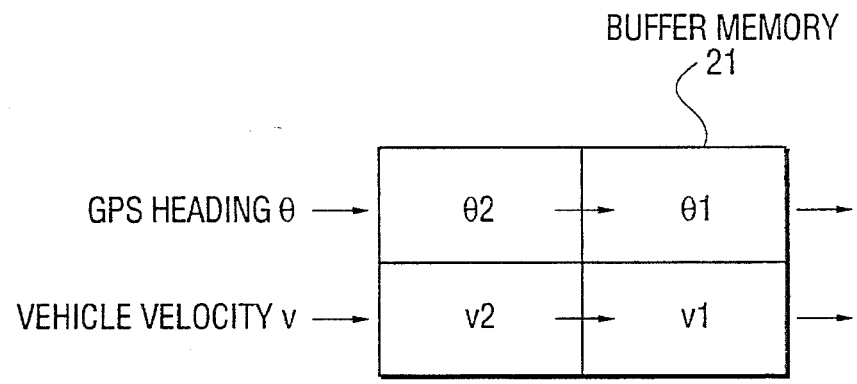
FIG. 5 shows the structure of the buffer memory of FIG. 1.

If the output data of the GPS receiver 42 are obtained, it will be determined in step S1 if end determination flag to be described later is "ON". Since the end determination flag is not "ON" for the first time, the step S1 advances to step S2. In the step S2, it is determined if the current velocity, v, of the vehicle obtained from the wheel sensor 41 is greater than a reference velocity, vc. In a case where the velocity of the vehicle is obtained from the output data of the GPS receiver 42, errors in the velocity of the vehicle become larger and larger if the velocity is low. It is therefore necessary to adopt the output data of the GPS receiver 42, only when the velocity of the vehicle is greater than the reference velocity vc. For this reason, in the step S2 the current velocity, v, is compared with the reference velocity, vc. If the current velocity, v, of the vehicle is not greater than the reference velocity, vc, the step S2 will advance to step S10. In the step S10, the GPS headings and θ2 and the vehicle velocities v1 and v2 that have been stored in the buffer memory 21 are cleared. If, on the other hand, the current velocity, v, of the vehicle is greater than the reference velocity, vc, the step S2 will advance to step S3. In the step S3, it is determined if the output data of the GPS receiver 42 are valid. There are some cases where a predetermined number of GPS satellites are obstructed by buildings or mountains. In such cases, the output data of the GPS receiver 42 are not valid. If the output data of the GPS receiver 42 are valid, the step S3 advances to step S4. In the step S4, the GPS heading θ2 is set to θ1 and the vehicle velocity v2 is set to v1. The valid GPS heading θ is stored as θ2, and the velocity of v at that time is stored as v2, as shown in FIG. 5.

The step S4 advances to step S5, in which it is determined if there is the first acquisition of the GPS data. If "YES", the step S5 advances to step S11, because there is no data for θ1 and v2. In the step S11, the integrated value of the gyro 43 is cleared. If "NO", the step S5 advances to step S6, in which it is determined if the new velocity v2 is smaller than the previous velocity v1. If "YES", the step S6 advances to step S7, because the vehicle starts decreasing its velocity, as will be seen from the peak at the time t1 of FIG. 4. In the step S7, the end determination flag is set to "ON". The step S7 advances to step S8, in which the previous velocity v1 and the GPS heading θ1 are registered. The velocity v1 and GPS heading θ1 thus registered are set to vA and θA, respectively. The step S8 advances to step S9, in which the integration of the output data of the gyro 43 is started.

If the step S9 returns back to the step S1, the step S1 advances to step S21 of FIG. 3, because the end determination flag is "ON". In the step S21, it is determined if the integration time of the output data of the gyro 43 is greater than a predetermined time tc. If the integration time of the data is too short, the data will contain a large error and offset correction will be made frequently. For these reasons, in the step S21 the integration time is compared with tc. If "NO", the step 21 advances to the step S9 in which the integration of the output data of the gyro 43 is started. If "YES", the step S21 advances to step S22, in which it is determined if the current velocity, v, of the vehicle obtained from the wheel sensor 41 is greater than the reference velocity, vc. If "NO", the step 22 advances to the step S9. If "YES", the step 22 advances to step S23, in which it is determined if the output data of the GPS receiver 42 are valid. If "NO", the step 23 advances to the step S9. If the output data of the GPS receiver 42 are valid, the step S23 advances to step S24. In the step S24, the GPS heading θ2 is set to θ1 and the vehicle velocity v2 is set to v1. The valid GPS heading θ is stored as θ2, and the vehicle velocity of v at that time is stored as v2.

Figure 6:
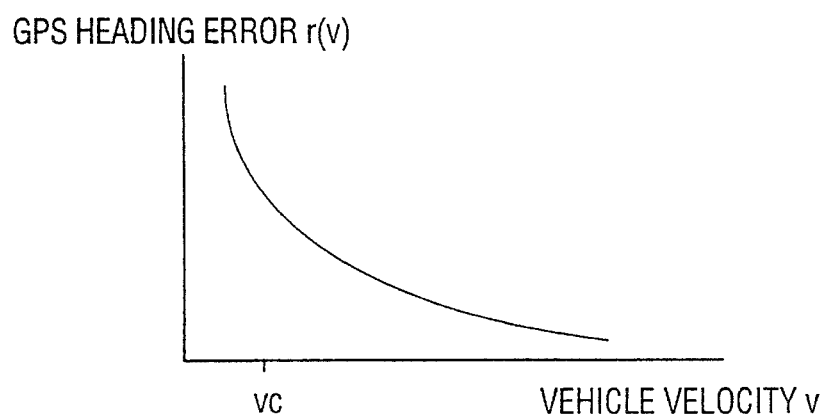
FIG. 6 is a graph showing how an error in the heading of a vehicle detected by the GPS receiver of FIG. 1 varies with time.

The step S24 advances to step S25, in which it is determined if there is the first acquisition of the GPS data. If "NO", the step S25 advances to step S26, in which it is determined if the new velocity v2 is smaller than the previous velocity v1. If "NO", the step 26 advances to the step S9. If "YES", the step S26 advances to step S27, because the vehicle starts decreasing its velocity, as will be seen from the peak at the time t2 of FIG. 4. In the step S27, the previous velocity v1 and the GPS heading θ1 are registered, and the velocity v1 and GPS heading θ1 thus registered are set to vB and θB, respectively. In addition, in the step S27 an estimated error ε of the offset of the gyro output is calculated by the following equation:

$$\epsilon^2 = \beta^2/T + \{k\Sigma\phi(t)\}^2/T^2 + \{r^2(v1) + r^2(v2)\}/T^2$$

where t1 is the time that vA and θA were registered in the step S8, t2 is the time that vB and θB were registered in the step S27, T is equal to (t2−t1), β is the noises of the gyro (constant), k is the scale factor of the gyro (constant), Σϕ(t) is the integration of ϕ(t) from t1 to t2, and r(v) is an error in the GPS heading. The r(V), as shown in FIG. 6, is obtained in advance as a function of the velocity of a vehicle (e.g., r(v)= av$^{-1}$+b, where a and b are constant). The reason why it is determined in the step 2 if the current velocity of the vehicle is greater than the reference velocity, vc, is that the GPS heading error r(v) increases if the current velocity is less than vc. As will be seen from the aforementioned equation, the estimated error of the offset, ε, is decreased with time.

The step S27 advances to step S28, in which a quantity of the offset of the gyro output, Ω, is obtained by the following equation:

$$\Omega = Be + \beta e \times T$$

where Be is an offset value as the previous offset correction was made, βe is a fluctuation rate of the offset per unit time, and both Be and βe are known values.

Figure 7:
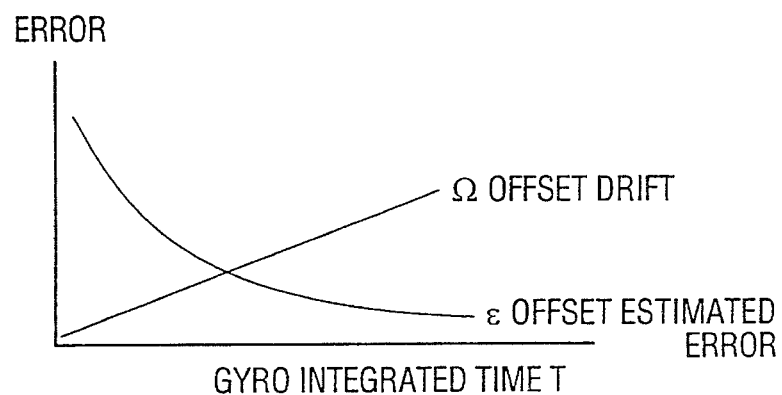
FIG. 7 is a graph showing how an estimated error of the offset of the gyro of FIG. 1 and a quantity of drift of the gyro offset are varied.
Figure 9:
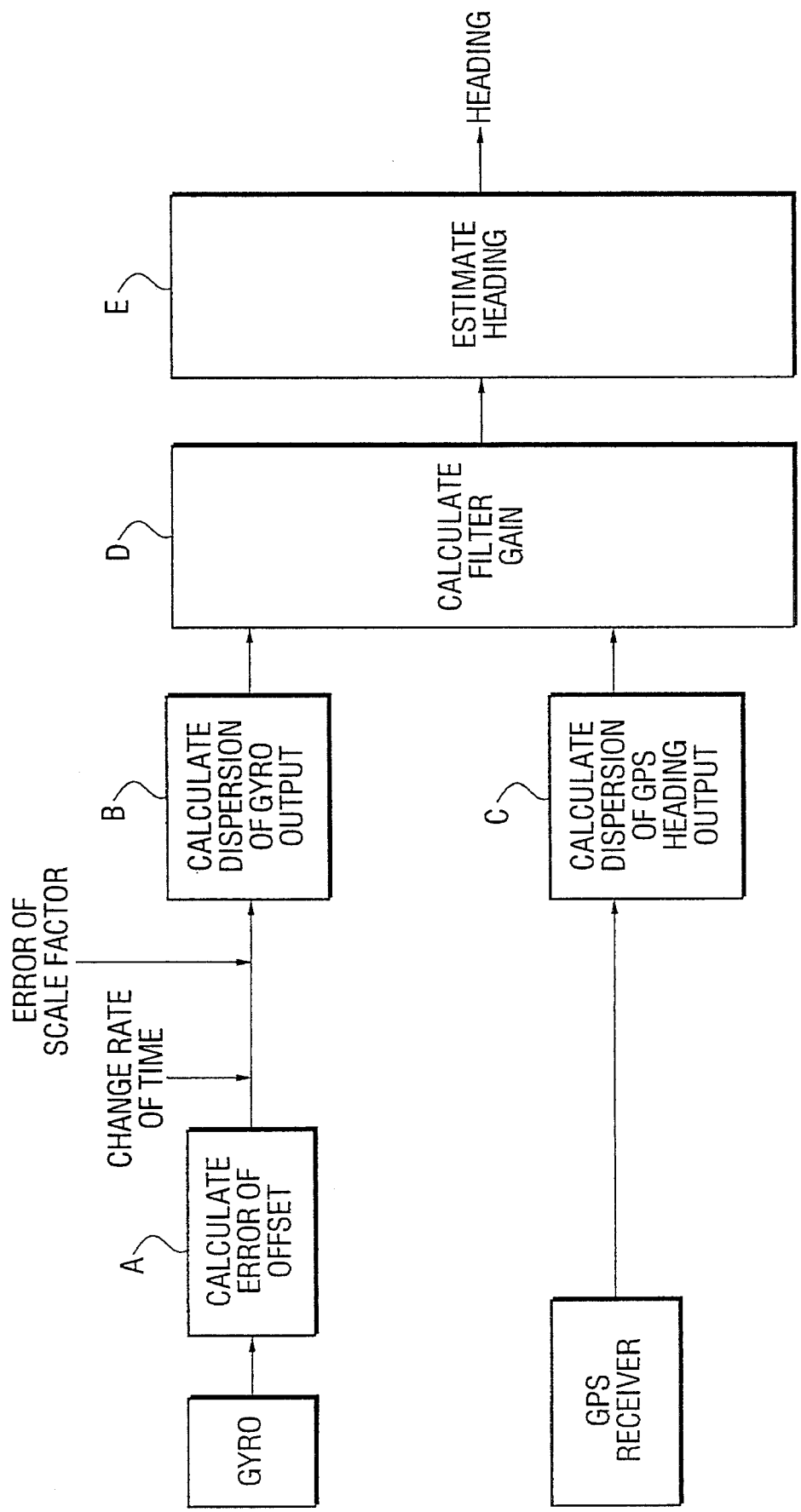
FIG. 9 is a block diagram of a heading detecting apparatus of the present invention.

In the step S28, it is determined if ε<Ω. If "YES", the step S28 advances to step S29, in which the offset is corrected (see FIG. 7). That is, a quantity of offset correction, δ, is calculated by the following equation:

$$\delta = \{\Sigma\phi(t) - (\theta B - \theta A)\}/T$$

In the way described above, independently of whether the vehicle is moving or stopped, the heading data θA and θB are obtained when the speed of the vehicle is the maximum (FIG. 4) and the turning angle of the vehicle, (θA−θB), is obtained. On the other hand, the output data of the gyro are integrated and the turning angle of the vehicle, Σϕ(t), is obtained. The offset correction quantity δ is obtained based on a difference between the two turning angles, and therefore the output of the gyro can be corrected with this offset correction quantity.

In the embodiment of the present invention, only when the velocity of the vehicle, v, is greater than the reference velocity, vc, and the velocity of v is the maximum value, the heading data are adopted. As a result, the heading data obtained under optimum conditions can be adopted. In addition, the estimated error of the offset, ε, is predicted from the curve of FIG. 6 and compared with the drift εxquantity Ω, and the offset correction is made only when e < Ω. Therefore, a meaningless offset correction, which would cause errors, can be avoided. Further, since the offset of the gyro is corrected only when the integration time of the gyro output is greater than the reference time, an intricate offset correction can be avoided.

Based on the gyro output data corrected with the method described above and the travel distance data obtained form the output of the wheel sensor 41, the current location of the vehicle is calculated.

Figure 10:
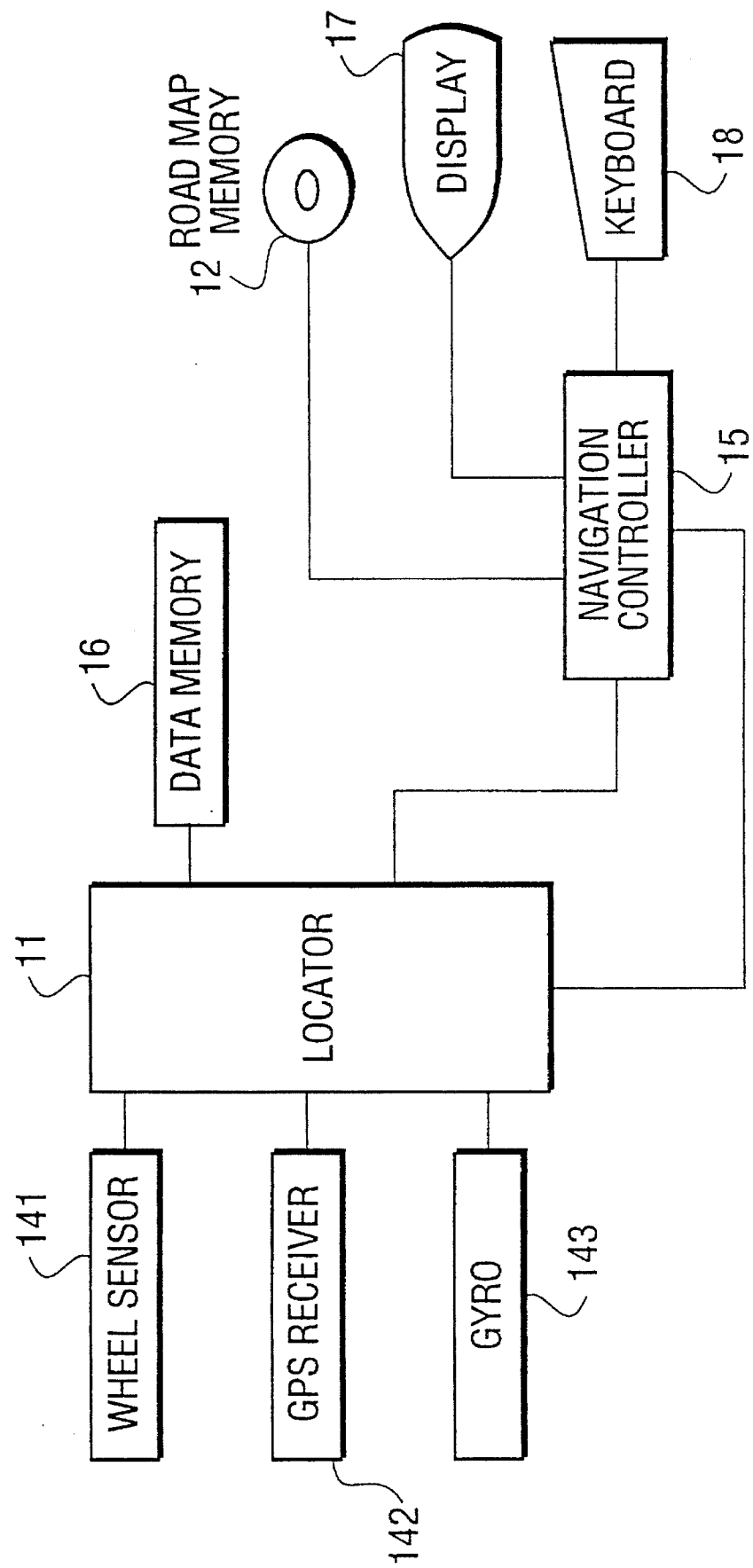
FIG. 10 is a block diagram illustrating a location detecting apparatus into which one embodiment of the heading detecting apparatus is incorporated.
Figure 11:
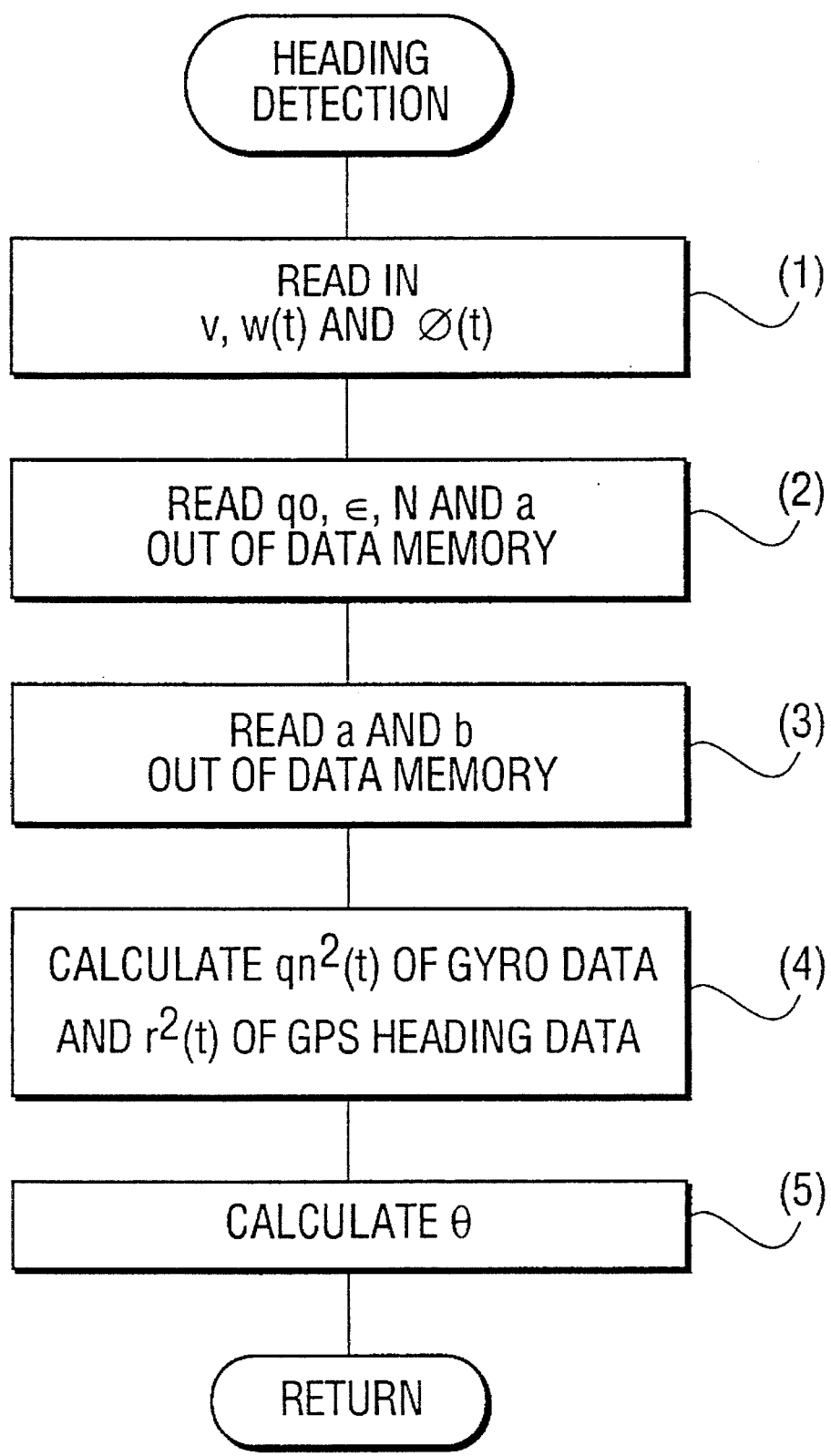
FIG. 11 is a flow chart illustrating how the heading of a vehicle is obtained according to the heading detecting apparatus of FIG. 9.

FIG. 10 illustrates a preferred embodiment of a heading detecting apparatus of the present invention which may be employed in a vehicle location detecting apparatus. The location detecting apparatus comprises a wheel sensor 141 which senses the number of rotations of the left and right wheels (not shown) respectively of a vehicle (this sensor is used as a distance sensor), a GPS receiver 142, and a gyro 143. The location detecting apparatus further comprises a road map memory 12 for storing road map data, a locator 11 which calculates an estimated heading of a vehicle in accordance with the output data sensed by the gyro 143 and GPS receiver 142 and also calculates the location of the vehicle with the aid of the data of the wheel sensor 141, a data memory 16 connected to the locator 11, a display 17 connected to the navigation controller 15 for displaying the current location of the vehicle, and a keyboard 18 connected to the navigation controller 15. The data memory 16 connected to the locator 11 has stored therein a heading error r(v) that is contained in the data of the GPS receiver 142, an error qo of a gyro offset value that is contained in the angular velocity data w(t) of the gyro 143, a gyro noise N, an error α of the scale factor of the gyro 143, etc.

In the locator 11 described above, the number of rotations of the wheel is obtained by counting the number of the pulses outputted from the wheel sensor 141 with a counter (not shown), and travel distance output data per unit time are calculated by multiplying the count data of the counter by a predetermined constant number indicative of a distance per one count. Also, a relative change in the heading of the vehicle is obtained from the gyro 143. Then, based on the relative change and the absolute heading output data of the GPS receiver 142, the locator 11 calculates the heading output data of the vehicle, as will be described below. The road map memory 12 stores road map data of a predetermined area in advance and comprises a semiconductor memory, cassette tape, CD-ROM, IC memory, DAT or the like. The display 17 comprises a CRT display, crystalline liquid display or the like and displays a road map that the vehicle is traveling and a current location of the vehicle. The navigation controller 15 is constituted by a graphic processor, an image processing memory and the like, and generates instructions to perform a retrieval of the map on the display 17, switching of scale, scrolling, a display of the current location of the vehicle and the like.

The data memory 16 stores a gyro offset error qo, an estimated change rate ε of the gyro offset error, a noise component N that is contained in the gyro output, a scale factor error α of the gyro (rate of a turning angle measured from the gyro output and an actual turning angle), and values for fixed numbers a and b in the GPS heading error, r(v)= av$^{-1}$+ b.

The angular velocity data w(t) of the gyro 143 and the heading data ϕ(t) of the GPS receiver 142 are sampled every constant time. If it is assumed that the time from the previous process from the current process is δt, the number of samplings will be proportional to the time δt.

The angular velocity data w(t) of the gyro as the vehicle is in its stopped state is normally zero, but the gyro generates an output if an offset occurs in the gyro. In estimating this gyro offset value, a value that has been used during travel before the vehicle stops is to be used. 0f course, the angular velocity data w(t) of the gyro during the stop of the vehicle can also be integrated and averaged.

The error qo of the gyro offset value represents what extent of fluctuation the gyro offset value has, and is obtained by sampling a plurality of the angular velocity data w(t) of the gyro during stop and calculating a dispersion that is contained in the plurality of angular velocity data w(t) of the gyro.

The estimated change rate ε of the gyro offset error is a value that is obtained from experience as a function of temperature.

The vehicle heading detecting process by the apparatus constructed as described above will hereinafter be described in detail. During travel, the location of the vehicle is displayed on the display 17 in accordance with the individual sensor output data stored in the locator 11. Also, during the display, the data of each sensor are read in every constant time by break-in, and then the heading of the vehicle is updated. The vehicle heading detecting flow at the time of this break-in is shown in FIG. 3. It is noted that the break-in may also be made every constant distance that is obtained based on the output data indicative of the distances traveled by the vehicle. The above described constant time or distance is set, depending upon the type of the gyro and the functional performance of the GPS receiver.

In step (1), the velocity v of the vehicle, the angular velocity data w(t) of the gyro 143 and the heading data ø(t) of the GPS receiver 142 are read in. Next, in step (2), the gyro offset value Ω, gyro offset error qo, change rate ε of the gyro offset error, noise component N, and the gyro scale factor error α are read out of the data memory 16. The step (2) advances to step (3), in which the fixed numbers a and b of the GPS heading error r(v) are read out of the data memory 16. When the heading of a vehicle is obtained from the heading data of the GPS receiver 142, the error in the heading is increased as the velocity of the vehicle is decreased, and the heading error of the vehicle becomes a monotonic decrease function of velocity. Therefore, the GPS heading error r(v) can be expressed as follows:

$$r(v)=av^{-1}+b$$

However, the GPS heading error is not limited to this function. For example, the GPS heading error can be expressed as follows:

$$r(v)=a \arctan(b/v)+c$$

In addition, an error in the measurement of waves from the GPS as well as the velocity of the vehicle can be taken into consideration. The estimated heading of the vehicle is obtained based on each data read out of the data memory 6. For this purpose, the step (3) advances to step (4), in which the dispersion $q^2(t)$ of the angular velocity data w(t) of the gyro 143 is first calculated by the following equation:

$$q^2(t)=(qo+\epsilon T)^2 \delta t^2 + N^2 \delta t + (\alpha \delta \theta)^2$$

where T is the time that has elapsed from the previous stop of the vehicle, qo is a gyro offset error (containing an error of quantization) which is a constant, εT is equal to the change rate of the gyro offset error multiplied by the elapsed time T and is an error resulting from a change (drift) of the gyro offset, and $N^2$ is a variance caused by noises. The reason that the errors qo and εT are added up is that these errors are not considered to be an independent phenomenon. If these errors are considered to be an independent phenomenon, then second power of qo and second power of εT will be added up (Japanese Patent Laid-open Publication HEI 3-279809). The reason that δt is not squared is that the noise error N is proportional to ½ power of the number of additions. δθ is a turning angle of the vehicle obtained by a difference between the previous turning angle and the current turning angle, and αδθ is a variance of the turning angle caused by the error of the scale factor. The value of a depends on the surrounding temperature and is determined every a certain temperature range as a gyro standard. Therefore, the value of α is used as it is.

Next, the variance $r^2(t)$ of the heading data ø(t) of the GPS receiver 142 will be calculated by the following equation:

$$r^2(t)=(av^{-1}+b)^2$$

In the step (5), by using $q^2(t)$ and $r^2(t)$, an estimated heading θ in which errors are taken into consideration is calculated by the following equation:

$$\theta(t)=K(t)\phi(t)+(1-K(t))(\theta(t-1)+w(t))$$

where θ(t) is a current heading, θ(t−1) is the previous heading, w(t) and ø(t) are sensor output data that are used as the current heading is calculated, and K(t) is a Kalman gain which is a variable of 0< K(t)<1. By using the previous Kalman gain K(t−1), K(t) is obtained by the following equation:

$$K(t)=(q^2(t)+\sigma^2(t-1))/(q^2(t)+r^2(t)+\sigma^2(t-1))$$

The variance of the estimated heading is calculated by the following equation:

$$\sigma(t)=(K(t)r^2(t))^{1/2}$$

As described above, the mean and variance of the estimated value of the gyro offset, the error of the change rate of that estimated value, the noise component, the error of the gyro scale factor, and the mean and dispersion of the error contained in the GPS receiver output have been calculated and stored. Then, when calculating the estimated heading of a vehicle, the variances that are contained in the output data of the gyro and GPS receiver are respectively calculated from the aforesaid stored data, and the estimated heading can be obtained based on the data that have been weighted. When the GPS heading data cannot be obtained for some reasons, K(t) is made 0 and the estimated heading θ is expressed by the following equation:

$$\theta(t)=\theta(t-1)+w(t)$$

From this estimated heading and the distance data of the wheel sensor 141, the estimated location of the vehicle can be calculated. At this point, it is a matter of course that a map matching method may be used which compares an estimated location of a vehicle with road map data, evaluates a degree of correlation with respect to road map data, corrects the estimated location and displays the current location of the vehicle on roads (Japanese patent "kokai" publications SHO 63-148115 and SHO 64-53112).

While the subject invention has been described with relation to the preferred embodiments, various modifications and adaptations thereof will now be apparent to those skilled in the art. For example, errors other than the aforementioned errors, such as an error of quantization caused by A/D conversion, can be taken into consideration.

What is claimed is:

1. A vehicle heading correcting apparatus comprising:

a gyro, integrating means for integrating output data of said gyro;

a global positioning system receiver for receiving waves from a plurality of satellites revolving around the earth to measure Doppler shift which occurs by receiving waves during travel of a vehicle, and for outputting heading data of the vehicle;

acquisition means for acquiring said heading data of said vehicle supplied from said global positioning system receiver;

first computing means for computing a first turning angle of said vehicle based on two consecutive data of said heading data acquired by said acquisition means;

second computing means for computing a second turning angle of said vehicle based on an integrated value of said output data of said gyro obtained by said integrating means during a period of time that said two consecutive data are acquired;

offset computing means for computing a difference between said first and second turning angles and for computing an offset value of said output data of said gyro by dividing said difference by said period of time; and offset correcting means for correcting said output data of said gyro with said offset value calculated by said offset computing means.

2. A vehicle location detecting apparatus comprising:

sensor means for sensing distances traveled by a vehicle;

a gyro;

integrating means for integrating output data of said gyro;

a global positioning system receiver for receiving waves from a plurality of satellites revolving around the earth to measure Doppler shift which occurs by receiving waves during the travel of said vehicle, and for outputting heading data of said vehicle;

acquisition means for acquiring said heading data of said vehicle supplied from said global positioning system receiver;

first computing means for computing a first turning angle of said vehicle based on two consecutive data of said heading data acquired by said acquisition means;

second computing means for computing a second turning angle of said vehicle based on an integrated value of said output data of said gyro obtained by said integrating means during a period of time that said two consecutive data are acquired;

offset computing means for computing a difference between said first and second turning angles and for computing an offset value of said output data of said gyro by dividing said difference by said period of time;

offset correcting means for correcting said output data of said gyro with said offset value calculated by said offset computing means; and location detecting means connected to said sensor means, said global positioning system receiver and said gyro, said location detecting means detecting a current location of said vehicle based on the corrected output data of said gyro and on said distances obtained from said sensor means.

3. The vehicle location detecting apparatus as set forth in claim 2, which further comprises a buffer memory connected to said location detecting means, a navigation controller connected to said location detecting means, a road map memory connected to said navigation controller, a display connected to said navigation controller, and a keyboard connected to said navigation controller.

4. A heading detecting apparatus comprising:

a global positioning system receiver for receiving waves from a plurality of satellites revolving around the earth to measure Doppler shift which occurs by receiving waves during travel of a vehicle, and for outputting first heading data of the vehicle;

a gyro for outputting angular velocity data of said vehicle;

deriving means for deriving second heading data dependent upon said angular velocity data;

first means connected to said gyro for calculating an error of an offset value that is contained in said angular velocity data of said gyro;

second means connected to said first means for calculating an error that is contained in said angular velocity data of said gyro, on the basis of said error of said offset value calculated by said first means, a change rate of time of said error of said offset value multiplied by a predetermined time, and said angular velocity data of said gyro multiplied by an error of scale factor of said gyro;

third means connected to said global positioning system receiver for calculating an error that is contained in said first heading data of said global positioning system receiver and depends on at least a velocity of said vehicle;

fourth means connected to said second means and said third means for calculating a variance of said angular velocity data based on said error of said angular velocity data of said gyro calculated by said second means and variance of said first heading data based on said error calculated by said third means and calculating a Kalman filter gain which is used for weighting said second heading data and said first heading data according to said variance of said angular velocity data and said variance of said first heading data; and fifth means connected to said fourth means for calculating a current estimated heading of said vehicle by the following equation:

$$\theta(t)=k(t)\phi(t)+\{((1-k(t))\{\theta(t-1)+w(t)\}$$

where $\theta(t)$ is said current estimated heading, $k(t)$ is said Kalman filter gain variable of $0< k(t)< 1$, $\phi(t)$ is said first heading data, $\theta(t-1)$ is a previously estimated heading, and $w(t)$ is said second heading data.

5. A location detecting apparatus comprising:

sensor means for sensing distance traveled by a vehicle, a global positioning system receiver for receiving waves from a plurality of satellites revolving around the earth to measure Doppler shift which occurs by receiving waves during the travel of said vehicle, and for outputting first heading data of said vehicle, a gyro for outputting angular velocity data of said vehicle;

deriving means for deriving second heading data dependent upon said angular velocity data;

first means connected to said gyro for calculating an error of an offset value that is contained in said angular velocity data of said gyro, second means connected to said first means for calculating an error that is contained in said angular velocity data of said gyro, on the basis of said error of said offset value calculated by said first means, a change rate of time of said error of said offset value multiplied by a predetermined time, and said angular velocity data of said gyro multiplied by an error of a scale factor of said gyro;

third means connected to said global positioning system receiver for calculating an error that is contained in said first heading data of said global positioning system receiver and depends on at least a velocity of said vehicle;

fourth means connected to said second means and said third means for calculating a variance of said angular velocity data based on said error of said angular velocity data of said gyro calculated by said second means and a variance of said first heading data based on said error calculated by said third means and calculating a Kalman filter gain which is used for weighting said second heading data and said first heading data according to said variance of said angular velocity data and said first variance of said first heading data;

fifth means connected to said fourth means for calculating a current estimated heading of said vehicle by the following equation:

$$\theta(t) = k(t)\phi(t) + \{(1-k(t)\}\{\theta(t-1) + w(t)\}$$

where $\theta(t)$ is said current estimated heading;

k(t) is said Kalman filter gain variable of $0 < k(t) < 1$, $\phi(t)$ is said first heading data, $\theta(t-1)$ is a previously estimated heading, and w(t) is said second heading data, and location detecting means connected to said sensor means, said global positioning system receiver and said gyro, said location detecting means detecting a current location of said vehicle based on said current estimated heading calculated by said fifth means and on said distances obtained from said sensor means.

6. The vehicle location detecting apparatus as set forth in claim 5, which further comprises a data memory connected to said location detecting means, a navigation controller connected to said location detecting means, a road map memory connected to said navigation controller, a display connected to said navigation controller, and a keyboard connected to said navigation controller.

* * * * *